Jan. 5, 1932.  L. N. CRICHTON  1,839,467
DISTANCE RELAY
Original Filed July 27, 1927
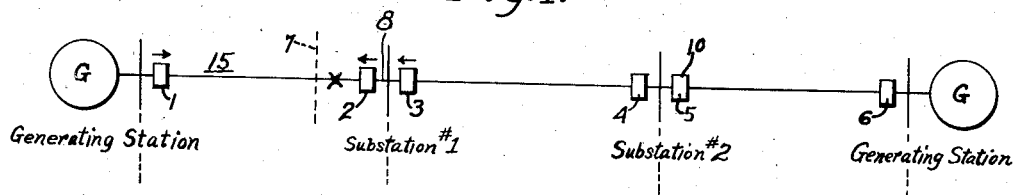
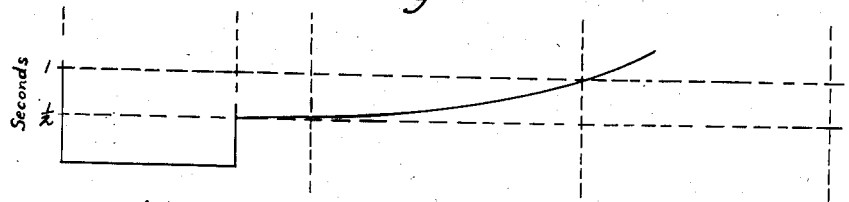
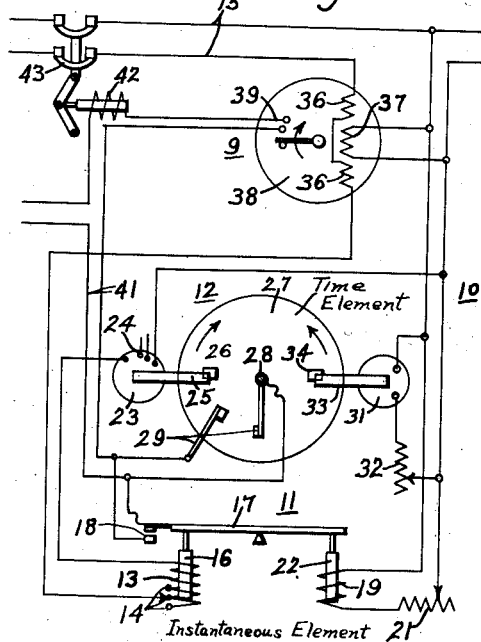
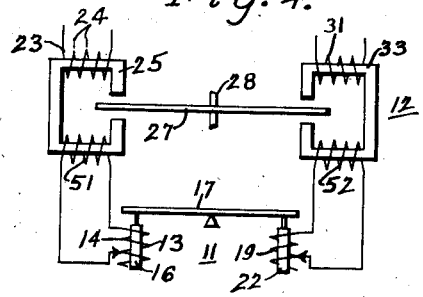
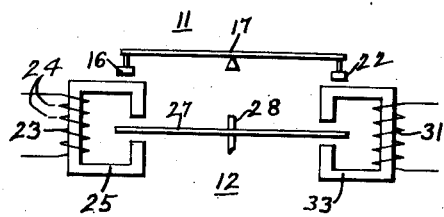
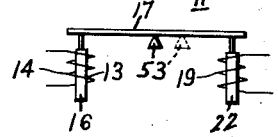
INVENTOR
Leslie N. Crichton
BY
ATTORNEY Patented Jan. 5, 1932

1,839,467

UNITED STATES PATENT OFFICE

LESLIE N. CRICHTON, OF EAST ORANGE, NEW JERSEY, ASSIGNOR TO WESTINGHOUSE ELECTRIC & MANUFACTURING COMPANY, A CORPORATION OF PENNSYLVANIA

DISTANCE RELAY

Application filed July 27, 1927, Serial No. 208,803. Renewed May 12, 1930.

My invention relates to electrical protective systems and particularly to systems and relays for isolating faulty sections of a power system.

One object of my invention is to provide a protective relay system for isolating a portion of an electrical system which becomes faulty.

Another object of my invention is to provide a protective system for obtaining selective operations within relatively short time intervals.

Another object of my invention is to provide relays having such characteristics that, in a system divided into a plurality of sections by substations and circuit interrupting devices, only those relays which are nearest to the faulty section and control the circuit interrupters, including the faulty section, shall operate to isolate that section.

Another object of my invention is to provide a relay, selective between local and remote faults, which will close instantaneously, independent of the location of a fault within a certain predetermined distance from the relay and which, beyond that predetermined distance, will automatically vary the time element of its operation in accordance with its distance from the location of the fault to the relay.

A further object of my invention is to provide easier means of adjustment for greater sensitivity in selective operation.

These and other objects that may be made apparent throughout the further description of my invention are attained by means of the apparatus hereinafter described and illustrated in the accompanying drawings.

My invention comprises, in general, an electrical protective system with protective relays for isolating faulty sections of a power system, divided into a plurality of sections by substations and having, at the end of each section, a protective relay with its associated circuit-interrupting device.

The protective relays are provided with such characteristics that they are selective between local or near-by faults, occurring only in the same section in which the particular relay apparatus is located, and remote faults occurring either in the same section or in adjacent or distant sections of the system. That is to say, each relay apparatus comprises one element or relay which delays its operation or automatically varies its time of operation in accordance with its distance from a fault, whether the fault occurs in a local section or in a remote section, and another element or relay cooperating therewith which operates instantaneously, independent of the location of a fault occurring within an approximate predetermined distance from the relay apparatus, said instantaneously operated element being associated with means for rendering it operative to respond only to faults in its own local section.

The instantaneously-responsive element is usually adjusted to operate for a fault occurring anywhere within the predetermined distance of about 80 percent of the length of section in which the particular relay apparatus is located. The relay apparatus is, therefore, selective "instantaneously," by which I mean, "within exceedingly short time intervals," for a local fault occurring within the predetermined distance, and, for faults beyond this same predetermined distance, delays its operation or varies its time for effective operation in accordance with the distance of the fault from the relay apparatus.

When a fault occurs in the system, the relays in the section in which the fault occurs will operate and cause the circuit to be interrupted at both ends of the section and thus isolate the section of the system which is faulty.

If the fault occurs relatively close to one set of the relays or within the predetermined distance of its distance adjustment, its instantaneous element will operate immediately; if the fault occurs beyond the scope of the same distance adjustment, the time element of the relay will respond in a time which will vary in accordance with the distance of the fault from the relay apparatus. If a fault occurs in a more or less midway position of the section, or within the distance adjustment of the two sets of relays, one at each end of the section, then the instantaneously responsive elements of both sets of relays will operate immediately.

This type of relay apparatus is then selective, as between the local, relatively near faults, in response to which it operates instantaneously, and the more remote faults, in response to which it becomes effective within a time which varies with the distance of the fault from the relay apparatus.

Both of the elements of this impedance relay apparatus are distance elements, one of them operating instantaneously if the trouble is close enough to the relay apparatus and the other one operating in a time limit for more distant troubles. The reason for this combination is to obtain proper selectivities at the far end of a section of lines where it is difficult for a relay to tell whether the trouble is within the section or not.

In order to provide for isolating only the faulty section and for preventing operation of relays in a non-faulty, adjacent or distant section, the instantaneous relays are provided, as has been usual in time-delay installations, with directional elements which permit the instantaneous relays to operate only when energy is flowing away from a substation bus. Therefore, only those relays which are nearest to the faulty section and control the circuit interrupters thereof, including the faulty section, operate to isolate that section.

To summarize, it may be said that the principal features of the relay apparatus of this invention in the specific modification disclosed are as follows:—

(a) A plurality of distance elements.

(b) Each distance element is effective to control the circuit interrupter by measure of the impedance of different portions of the line to be protected.

(c) Each distance element has a different time-distance characteristic.

(d) One distance element has an instantaneous time-distance characteristic.

(e) Another distance element has an inverse time-distance characteristic substantially independent of magnitude of line current.

(f) A wattmeter relay is provided for directional discrimination.

Referring to the accompanying drawings, Figure 1 is a schematic diagram of an electrical system divided by substations into three sections, each having a protective relay apparatus at its two ends.

Fig. 2 is a typical time-distance curve for a protective relay apparatus according to my invention. It shows the time required for such relay apparatus to operate when faults occur at various distances from the relay. The distances shown correspond to those shown in Fig. 1.

Fig. 3 is a diagrammatic view of a portion of a section of an electrical system, showing the elemental connections to the system, the relay apparatus embodying my invention, the relative arrangement of its different parts and the connections thereof to the circuit.

Fig. 4 is a schematic view of a modification of the relay apparatus embodying my invention, showing one means of energizing the instantaneously-responsive element from the electro-magnetic circuits of the time-element-responsive device.

Fig. 5 is a schematic view of a modification showing operation of the instantaneously-responsive device from the leakage fluxes produced by the electromagnetic circuits of the time-element-responsive device.

Fig. 6 is a schematic view of a modification of the means of adjustment for the instantaneously-responsive device.

In practicing my invention, I provide a protective relay apparatus 10, with its associated circuit interrupter, represented at location 1 at the end of one section of an electrical system comprising a plurality of sections divided into sections by substations.

Similarly, other sets of protective relays 10 of the same type are represented at locations 2, 3, 4, 5, and 6, being disposed at the ends of each section, with their associated circuit interrupters.

The protective relay apparatus 10 has two principal elements or devices, one an instantaneously-responsive device 11 and the other a time-element device or long-time-responsive device 12. It also has the aforementioned "directional element" 9 in some cases.

The instantaneously-responsive device 11 comprises a current coil 13, having a plurality of taps 14 for purposes of adjustment, and is energized in accordance with the current of the circuit 15 being connected to the circuit either directly or through suitable current transformers, and, when energized, tends to actuate a movable core member 16, connected to a pivoted contact lever 17 in a direction to close contacts 18.

A voltage winding 19, energized directly or through suitable voltage transformers, in accordance with the voltage of the circuit 15 and adjusted by a resistance means 21, controls a movable core member 22, connected to the pivoted contact lever 17 in such a manner as to oppose or restrain or counter-balance the effect of the current winding 13 heretofore referred to.

The time-delay or time-element-responsive device 12 comprises a current winding 23, energized directly or through suitable current transformers, in accordance with the current of the circuit 15 and having a plurality of taps 24 for purposes of adjustment, a stationary core member 25 energized thereby and having shade coils 26 on its pole pieces, an induction disc 27 rotating about an axis 28 and actuated in the one direction according to the effects of the current winding 23 to effect engagement of the contacts 29, a voltage coil 31, energized in accordance with the voltage of the circuit 15 and having resistance means of adjustment 32, a stationary core member 33 energized thereby and having shade coils 34 on its pole pieces and opposing or restraining or counter-balancing the effects of the current winding 23 by tending to rotate the induction disc 27 in the opposite direction.

The instantaneous element 11 may also be of an induction disc type instead of the pivoted contact device illustrated in the drawings for element 11.

The "directional element" 9 which is provided comprises a current element 36, a voltage element 37, arranged to rotate an induction disc 38 and to effect engagement of its contacts 39 only when the energy flow in circuit 15 is in a direction away from the station bus at which the relay apparatus 10 is located.

The contacts 18 of the instantaneously-responsive device 11 are connected in parallel with the contacts 29 of the time-element-responsive device 12 and are both connected in series in the circuit 41, with contacts 39 at the directional element 9, and with operating coil 42 of a circuit interrupter 43. The circuit 41 is energized from a suitable source of electrical energy.

I provide various modifications, as follows, of means for adjustment, in addition to those heretofore described.

On the stationary core member 25 of the time-element-responsive device 12, as illustrated in Fig. 4, I provide another winding 51, connected electrically to the current winding 13 of the instantaneously-responsive device 11. Similarly, on the stationary core member 33, I provide another winding 52, connected electrically to the voltage winding 19 of the instantaneously-responsive element 11. By providing a suitable ratio of turns between the windings 51 and 13 and between the windings 52 and 19, the number of adjustments required on the instantaneously-responsive element 11, is reduced.

As another means of adjustment, as illustrated in Fig. 5, the movable core member 16 of the instantaneously-responsive device 11 may be disposed adjacent to the stationary core member 25 of the time-element-responsive device 12, in such manner as to be operated from the leakage flux produced by the stationary core member 25. Similarly, the movable core member 22 of the instantaneously-responsive device 11 may be disposed adjacent to the stationary core member 33 of the time-element-responsive device 12, in such a manner as to be operated from the leakage flux produced by the stationary core member 33.

As another means of adjustment, as illustrated in Fig. 6, a pivot 53 may be provided and made adjustable to various positions of support of the lever 17, of the instantaneously-responsive device 11, to determine the ratio of balance produced by the effects of windings 13 and 19 upon each end of the pivoted contact lever 17.

Further optional means of adjustment may be provided, such as a number of interchangeable shade coils for use on the pole pieces of the stationary core members of the time-element-responsive device, means for rotating the pole pieces having shade coils, means for shifting the location of poles with respect to the induction disc of the time-element-responsive device and means for varying the distance of contact travel of the time-element-responsive device.

Under normal conditions in the system 15, the contacts 18 of the instantaneously-responsive device 11 and the contacts 29 of the long-time-responsive device 12, are adjusted to remain open or non-operative. But when a fault occurs in the system within the scope of adjustment of the particular relay apparatus 10, either contacts 18 or contacts 29 will engage, depending upon whether the fault is relatively local or remote, and either set of contacts causes the operating coil 42 of the circuit interrupter 43 to be energized to interrupt the circuit 15 provided the energy flow in circuit 15 is in a proper direction to close the contacts 39 of the directional element 9 or to keep them closed if they are already closed before the occurrence of the fault.

When such a fault occurs beyond the predetermined distance referred to, the current from circuit 15, energizing current winding 23 of the time-element-responsive device 12 will increase above an amount necessary to overcome the adjusted restraining torque produced by the voltage winding 31, and the induction disc 27 will start to rotate in a direction to effect engagement of the contacts 29. The time required to effect engagement of the contacts 29 will depend upon the distance location of the fault with respect to the relay. The nearer the fault is to the relay apparatus 10, the less will be the circuit voltage 15 impressed upon the voltage-restraining windings and, consequently, the less will be the time required to effect engagement of the contacts 29. In other words, the time required for the time-element-responsive device 12 to operate will vary as the distance of the fault from the relay 10, with a given adjustment of the relay, as in the ordinary "distance relay".

Such adjustment will depend upon the constants of the system and particularly of that portion which the relay is to protect, and will be made after installations in the system, so that the time-delay relay apparatus will perform its relaying operation after the end of the faulty section nearest the fault has been fully cleared, as will be subsequently pointed out.

The time required for the time-element-responsive device 12 to operate will be substantially independent of the magnitude of the fault current, and the curve of time versus distance, as illustrated in Fig. 2 is, therefore, a typical curve, no matter what the value of fault current may be.

This result is obtained by utilizing the damping action on the moving induction disc 27 produced by the flux set up by the two windings 23 and 31 and, particularly, by that set up by the current winding 23 through the core member 25 and the associated shade coil 26 on the pole pieces of the core member 25.

The shade coil 26, by reason of the shifting field "or out-of-phase flux" which it produces, provides the motivating torque which tends to rotate the disc 27 and which is ever present whether the disc 27 is in motion or is at rest.

When, however, the disc 27 is in motion, a damping action or a retarding action is set up by the flux which may be called the "drag" of the flux on the disc 27. This drag or damping action is similar to that which would be produced by a permanent magnet acting upon the disc 27, except that the former varies with the magnetic field strength which, in turn, depends upon the current in the current winding 23.

In a similar manner, the voltage winding 31 provides both a motivating-torque and a drag-torque action upon the disc 27.

Both the motivating torque and damping or drag vary according to the same law so that, for a given position of fault in the power system, the speed of the disc will be the same, no matter how much current flows. In other words, the time of operation of the time-element device will be substantially independent of the magnitude of the fault current.

The significance of the foregoing explanation of my new principle of designing the induction-disk relay, so that its "drag" effect suffices to hold the speed down to desired values, will be better understood when it is remembered that, in induction-disk meters, the "drag" effect is a serious thing, detracting from the accuracy of the meter, and therefore to be avoided. In such meters, the speed of the disk must be proportional to the current in the magnet coil, and this is accomplished by opposing the rotation-producing torque of the shaded-pole magnet member by means of eddy-currents induced in the disk by a permanent magnet which has a flux many times larger than the fluxes in the current-excited shaded-pole magnet member. In such cases, the rotation-producing torque of the shaded-pole magnet member is made as large as possible, as compared to its "drag" effect, so that the total torque produced by this magnet member on the disk is substantially proportional to the square of the current in the coil, which, when equal and opposite to the permanent-magnet force which is proportional to the square of the speed, makes the current and speed proportional. Thus, the drag effect of the coil-excited magnet was as nearly negligibly small, compared to the drag effect of the permanent magnet, as possible. In other words, the fluxes in the coil-excited magnet were small and the shading was very strong.

In my present design, however, the permanent magnet is omitted, so that the disk quickly attains its maximum, constant speed, at which its own drag effect is exactly equal and opposite to its rotation-producing torque. Here, however, the drag effect is not only proportional to the square of the speed, but it is also proportional to the square of the flux, which, in turn, is proportional to the square of the current in the coil. Since the rotation-producing flux of the current-excited magnet member 25 is also proportional to the square of the current, it thus becomes evident that the speed of the disk is independent of the value of the current.

The addition of the opposing, voltage-excited, shaded-pole magnet member 33, however, causes the total rotation-producing force on the disk to be proportional to the square of the line current minus the square of the line voltage, so that the speed of the disk is independent of either the current strength or the voltage strength, being dependent solely upon their ratio.

This function of my time-distance element is important in causing the relay to have the same speed, for a given distance of fault, no matter how many generators are connected to the system. Without this feature, that is, if the time element utilized a permanent-magnet drag effect, the speed would be four times as great, and hence the time-delay one-fourth as great, for example, with two generators connected in service, at times of peak load, as with one generator in service when the maximum short-circuit current would be one-half as great.

The current from circuit 15, upon the occurrence of a fault, will tend to actuate the pivoted contact lever 17 in a direction to effect engagement of the contacts 18, but the lever 17 is restrained, in its operation, by the effects of the voltage impressed upon the voltage winding 19, to a degree depending upon the location of the fault with respect to the relay. Under given conditions of adjustment, the nearer the fault is to the relay, the lower will be the voltage impressed upon the voltage winding 19, and, consequently, the less will be its restraining effect.

By means of the resistance means of adjustment 21 or other means of adjustment, the forces acting on the lever 17 may be balanced to respond to a fault occurring within a predetermined distance from the relay, and, for such a fault, it will respond and effect engagement of contacts 18 without any time delay whatever. For a fault occurring beyond this same predetermined distance, the instantaneously-responsive device 11 will not respond at all.

The relay apparatus 10 is then selective to respond instantaneously for faults occurring anywhere within the predetermined distance referred to and, beyond the same distance, to respond with time delay which will vary as the distance of the fault from the relay.

When relay apparatus 10, as described, are installed in a system as shown in Fig. 1 and adjusted to respond instantaneously within a distance of about 80 percent of the length of a section, a typical time-distance curve of one of them located at location 1, will be as shown in Fig. 2. For a fault occurring anywhere within the predetermined adjustment of distance 1 to 7, the instantaneous element 11 will operate instantaneously and trip its associated circuit breaker or interrupter, the characteristics of which, in this particular instance, require ½ second to interrupt the circuit. The time adjustment of the time-delay device of this relay, will then be adjusted to operate in ½ second for a fault at location 7. From Fig. 2, it will be seen that this time-delay period has a substantially constant value of, say ½ second, for all faults in the faulty section between the points 7 and 8 of Fig. 1.

To illustrate the operation of the relays in a system, assume a short circuit or fault occurring at "X" (Fig. 1). The energy flow in the system will be in the directions indicated by the arrows. Since the fault is beyond the predetermined distance adjustment for the relay apparatus 10 located at location 1, its instantaneously-responsive device 11 will not operate but its relatively long-time-delay device 12 will operate and interrupt the circuit at location 1. Thus, the time-delay distance-responsive device 12 may be defined as a distance-responsive relay apparatus which makes a switching operation after the opening of the circuit breaker at the end of the line-section nearest the fault. The fault being close to the relay installed at location 2, its instantaneously-responsive element will operate and interrupt its associated circuit interrupter. The faulty section will, therefore, be isolated by interrupting the circuit at both ends.

The relay apparatus installed at location 3 will not operate because its directional element, like the directional elements of the other set of relays, has been set to keep its contacts closed only when energy is flowing away from its station bus 8. Therefore, since energy is flowing through the relay installed at location 3, toward the station bus 8, it will open its contacts, if they were previously closed, or keep them open if they were already open, and only those relays nearest the fault will operate to isolate the faulty section. It will be understood, therefore, that the directional element 9 is substantially as "instantaneous" as the so-called instantaneous relay 11, or even more instantaneous in its operation, so that, when it is located in a line-section in which the current may normally flow from the adjacent sectionalizing station, the directional element 9 will open its contacts before the instantaneously operating relay at said location 3 has had a chance to trip its associated relay in the clear line-section between substations Nos. 1 and 2. In all relays such as those installed at locations 2, 3, 4 and 5 through which energy can flow both to and from a station bus, a directional element will be needed. But in relays such as those installed at locations 1 and 6, in a single-circuit line, such as the line which is illustrated, no directional element will be needed.

In summary, my invention provides a protective-relay system for isolating a portion of an electrical system which becomes faulty, and for obtaining selective operations within relatively short time intervals, and for operating only those relays which are nearest to the faulty section. It also provides a relay selective to operate instantaneously for local faults, and, for remote faults, to automatically vary the time element of its operation in accordance with its distance from the fault.

Special attention is again called to the fact that the interrupter control means utilized in this invention includes a relay apparatus of the so-called "distance" or "impedance" type having in combination an instantaneous element and a time delay, or retarded element, both of which elements are "distance" elements and therefore both of which measure the impedance of the line. The principal reason for the combination of the instantaneous impedance element with the time-delayed impedance element is to obtain proper selectivities at the far end of a section of lines where it has been difficult for a fault responsive apparatus heretofore used to tell whether the trouble is within the section or not.

I claim as my invention:

1. A protective relay apparatus energized from an electrical system including means adjusted to operate instantaneously independently of the location of a fault in the system within a certain predetermined distance from the relay apparatus, and cooperating means adjusted to automatically vary the time element of its own operation in accordance with the location of a fault in the system beyond such predetermined distance.

2. In an electrical system, a protective relay apparatus energized to operate in accordance with the circuit current and mechanically restrained in accordance with the circuit voltage including an instantaneous responsive device adjusted to operate instantaneously independently of the location of a fault within a certain predetermined distance from the relay apparatus and cooperating therewith a time-element-responsive device adjusted to automatically vary the time element of its own operation in accordance with the location of a fault beyond such predetermined distance.

3. In an electrical system, a protective relay apparatus of the current-actuated voltage-restrained type including an instantaneously operating device provided with a pivoted contact lever and means for adjusting the device to permit it to operate in response to a fault in the system within a predetermined distance from the relay apparatus, and a time element device of the induction-disc type provided with means for adjusting it to operate in accordance with the distance of a fault from the relay apparatus, whereby the relay apparatus will effect an instantaneous operation in response to a fault within a predetermined distance and a delayed operation in response to a fault beyond such distance.

4. A protective relay apparatus for an electrical system energized in accordance with the circuit current for closing an external control circuit and energized in accordance with the circuit voltage for opposing the closing of the circuit including a pivoted-contact-lever-instantaneously-responsive device adjusted to close only when a fault occurs in the system within a predetermined distance from the relay apparatus, and, in combination therewith, an induction-disc long-time-responsive device adjusted to be effective when a fault occurs beyond the said predetermined distance.

5. In an electrical system divided into several sections, the combination with a circuit-interrupter at each end of each section, of means for selectively operating the interrupter upon the occurrence of a fault to isolate the faulty section including a relay apparatus associated with each interrupter and having an element energized from the system to operate within a time interval varying as the distance between the relay apparatus and the fault, and having an associated element adjusted to operate instantaneously in response to a fault in the associated section within a predetermined distance from the relay apparatus.

6. A protective relay apparatus energized from an electrical system comprising means adjusted to operate instantaneously independently of the location of a fault in the system within an approximate predetermined distance from the relay apparatus, cooperating means adjusted to automatically vary the time element of its own operation with the location of a fault in the system beyond such predetermined distance, and a directional element for permitting the relay apparatus to operate only when fault current flows in a direction away from the source of power through the relay apparatus to the fault.

7. The combination with a section of a power circuit, of a circuit-interrupter, and interrupter control means including a distance relay responsive instantaneously for local power circuit faults only, another distance or impedance relay responsive to remote faults with a time delay in accordance with the distance from the fault and independently of the magnitude of the fault current, and a directional or wattmeter relay.

8. The combination with a section to be protected in a power circuit, of a circuit interrupter, and interrupter control means including a plurality of distance or power-circuit impedance-measuring relays each having different time characteristics, each effective for different distance portions of the power circuit and one having an inverse time-distance characteristic.

9. The combination with a section of a power line and a circuit interrupter therefor, of a distance relay apparatus having two elements, one element being adjusted according to the impedance of the line to operate instantaneously upon the occurrence of a fault within a predetermined distance from the relay apparatus approximately 80 percent of the length or distance of the section to be protected, and the other element being adjusted according to the impedance of the line to be effective with inverse time delay upon the occurrence of a fault beyond said 80 percent distance from the relay apparatus.

10. The combination with a line to be protected and a circuit interrupter therefor, of relay apparatus having a plurality of distance elements each effective to control the interrupter by measure of the impedance of different distance portions of the line, one of said elements having an instantaneous time characteristic and another of said elements having an inverse-time-distance characteristic independent of magnitude of line current.

11. The combination with a line to be protected and a circuit interrupter therefor, of relay apparatus having a plurality of distance elements each effective to control the interrupter by measure of the impedance of different distance portions of the line, one of said elements having an instaneaneous time characteristic and another of said elements having an inverse-time-distance characteristic independent of magnitude of line current.

12. A relay including a movable member, two opposing electromagnetic elements for controlling the movement of said member in a time dependent on the unbalance between said elements and movable magnetic means arranged to be controlled by the leakage fluxes of said elements and to be actuated substantially instantaneously when the energization of one of said elements exceeds the other by a predetermined amount.

13. A relay including a movable member, two opposing electromagnetic elements for controlling the movement of said member, contacts arranged to be actuated by said member after a time dependent on the unbalance between said elements, movable magnetic means associated with said elements and arranged to be controlled by the leakage fluxes thereof and other contacts arranged to be actuated by said means substantially instantaneously when the energization of one of said elements exceeds the other by a predetermined amount.

14. A relay including a rotatably mounted disk, two opposing electromagnetic motor elements inductively associated with said disk for controlling the movement thereof, contacts arranged to be actuated by said disk after a time dependent on the unbalance between the torques exerted by said motor elements, movable magnetic means arranged to be controlled by the leakage fluxes of said motor elements and other contacts arranged to be actuated by said means substantially instantaneously when the leakage flux of one of said elements exceeds the leakage flux of the other by a predetermined amount.

15. In combination with an electric circuit and circuit interrupting means therefor, means for controlling said circuit interrupting means on the occurrence of an abnormal condition with a time delay dependent on a current and a voltage of the circuit, including a movable member, two opposing electromagnetic elements for controlling the movement of said member respectively connected to be energized in accordance with a current and a voltage of the circuit, and means for effecting a substantially instantaneous release of said circuit interrupting means when the current of the circuit has increased relatively to the voltage by a predetermined amount, including magnetic means associated with said elements and arranged to be controlled by the leakage fluxes thereof.

16. In combination with a time element induction disk relay having opposing current and voltage elements, a pivotally mounted contact controlling member having its ends respectively arranged to be influenced by the leakage fluxes of said voltage and current elements, said member being biased for movement to one position and movable to another position only when the energization of the current element has increased relatively to the voltage element by a predetermined amount.

17. In combination with a time element induction disk relay having opposing voltage and current elements, a pivotally mounted contact controlling member having its ends subject respectively to the influence of said voltage and current elements and arranged to be moved to contact actuating position substantially instantaneously only when the energization of the current element has increased relatively to the energization of the voltage element by a predetermined amount.

18. In combination with a time element relay having two opposing electromagnetic elements, a contact controlling member having magnetic means arranged to cooperate with said elements and to be moved to contact actuating position substantially instantaneously only when the energization of one of said elements has increased relatively to the energization of the other element by a predetermined amount.

19. An induction-disk contact-making time-delay relay comprising a current-excited shaded-pole magnet member and an opposing voltage-excited shaded-pole magnate member, wherein the resultant rotation-producing torque of the two members is substantially equal and opposite to the drag effects of these members themselves, when the disk is turning, so that the speed of turning is determined substantially exclusively by the ratio of the current and voltage applied to excite said magnet members, and not by the absolute value of either.

20. Protective apparatus for an electric power line, for responding to faults within less than a predetermined distance from the relaying point, comprising an induction-disk contact-making time-delay relay having two opposing torque-producing magnet members, wherein the resultant rotation-producing torque of the two members is substantially equal and opposite to the drag effects of these members themselves, when the disk is turning, so that the speed of turning is determined substantially exclusively by the distance of the fault, regardless of the value of the fault current.

In testimony whereof, I have hereunto subscribed my name this 23rd day of July 1927.

LESLIE N. CRICHTON.